United States Patent
Bartley et al.

(10) Patent No.: US 9,857,949 B2
(45) Date of Patent: *Jan. 2, 2018

(54) GENERATING A CONTEXT FOR TRANSLATING STRINGS BASED ON ASSOCIATED APPLICATION SOURCE CODE AND MARKUP

(71) Applicant: INTERNATIONAL BUSINESS MACHINES CORPORATION, Armonk, NY (US)

(72) Inventors: Timothy S. Bartley, Worongary (AU); Gavin G. Bray, Robina (AU); Elizabeth M. Hughes, Australia Fair (AU); Kalvinder P. Singh, Miami (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,822

(22) Filed: Dec. 13, 2016

(65) Prior Publication Data
US 2017/0083200 A1 Mar. 23, 2017

Related U.S. Application Data

(63) Continuation of application No. 15/211,293, filed on Jul. 15, 2016, now Pat. No. 9,720,908, which is a (Continued)

(51) Int. Cl.
*G06F 3/00* (2006.01)
*G06F 3/0484* (2013.01)
(Continued)

(52) U.S. Cl.
CPC .............. *G06F 3/0484* (2013.01); *G06F 8/40* (2013.01); *G06F 9/4448* (2013.01);
(Continued)

(58) Field of Classification Search
CPC ......... G06F 17/2872; G06F 3/481; G05F 8/40
(Continued)

(56) References Cited

U.S. PATENT DOCUMENTS 9,436,679 B2   9/2016 Bartley et al.
9,501,471 B2  11/2016 Bartley et al.
(Continued)

FOREIGN PATENT DOCUMENTS

WO   2014168626 A1   10/2014

OTHER PUBLICATIONS

U.S. Appl. No. 13/909,386, filed Jun. 4, 2013.
(Continued)

*Primary Examiner* — Haoshian Shih
(74) *Attorney, Agent, or Firm* — Maeve M. Carpenter

(57) ABSTRACT

An approach to generating a context for translating strings for a graphical user interface. The approach includes a computer receiving a string to be translated and associated source code, the string identified by a unique key within the associated source code and the associated source code is markup language. The computer identifies a first logical section of the associated source code corresponding to a unique key of the string and one or more graphical user interface components within the identified logical section of the associated source code. The computer then creates a mockup image presenting the one or more graphical user interface components and the string. The computer then labels, in the created mockup image, each of the one or more graphical user interface components and the first string of the plurality of strings, and identifies one or more additional graphical user interface components.

1 Claim, 4 Drawing Sheets

Related U.S. Application Data continuation of application No. 14/967,888, filed on Dec. 14, 2015, now Pat. No. 9,436,679, which is a continuation of application No. 13/909,386, filed on Jun. 4, 2013, now Pat. No. 9,501,471.

(51) Int. Cl.
  *G06F 9/45* (2006.01)
  *G06F 17/28* (2006.01)
  *G06F 9/44* (2006.01)
  *G06F 17/22* (2006.01)

(52) U.S. Cl.
  CPC ...... *G06F 17/2247* (2013.01); *G06F 17/2836* (2013.01); *G06F 17/2872* (2013.01)

(58) Field of Classification Search
  USPC .............................................. 715/762; 704/2
  See application file for complete search history.

(56) References Cited

U.S. PATENT DOCUMENTS

| | | |
|---|---|---|
| 2008/0119235 A1 | 5/2008 | Nielsen et al. |
| 2008/0133216 A1 | 6/2008 | Togami |
| 2009/0276206 A1 | 11/2009 | Fitzpatrick et al. |
| 2010/0325540 A1 | 12/2010 | Biazetti et al. |
| 2011/0126098 A1 | 5/2011 | Jellison, Jr. |
| 2013/0007588 A1 | 1/2013 | Guo et al. |
| 2016/0314117 A1 | 10/2016 | Bartley et al. |

OTHER PUBLICATIONS

U.S. Appl. No. 14/967,888, filed Dec. 14, 2015.
U.S. Appl. No. 15/211,293, filed Jul. 15, 2016.
Kovacs, "ScreenMatch: Providing Context to Software Translators by Displaying Screenshots", CHI 2012, May 5-10, 2012, USA, Copyright Geza Kovacs, 6 pages.
Wang et al., "TranStrL: An automatic need-to-translate string locator for software internationalization", 2009 IEEE 31st International Conference on Software Engineering, May 16-24, 2009, Vancouver, BC, Canada, pp. 555-558.

GENERATING A CONTEXT FOR TRANSLATING STRINGS BASED ON ASSOCIATED APPLICATION SOURCE CODE AND MARKUP

FIELD OF THE INVENTION

The present invention relates generally to the field of language translation, specifically with respect to internationalization and localization, and more particularly to generating a context for translating strings for internationalization and localization based on associated application source code and markup.

BACKGROUND OF THE INVENTION

Internationalization and localization are means of adapting computer software to different languages, regional differences and technical requirements of a target market. Internationalization is the process of designing a software application so that it can be adapted to various languages and regions without engineering changes. Localization is the process of adapting internationalized software for a specific region, culture, or language by adding locale-specific components, translating text, ensuring pictures are culturally acceptable and removing references that may not be relevant. "Globalization" is a term coined by the software industry for the combination of internationalization and localization.

In the localization process, application developers place text in strings which are loaded during program execution as needed. The strings that require translation and keys that identify the strings are stored in resource files, which are provided to a translator who translates each string. The translator typically does not have context for the translation.

SUMMARY

Embodiments of the present invention disclose a method, computer program product, and computer system for generating a context for translating strings for a graphical user interface. The computer system includes receiving a string to be translated and associated source code, the identified by a unique key within the associated source code. The computer system includes identifying a first logical section of the associated source code corresponding to a unique key of the string. The computer system includes identifying one or more graphical user interface components within the identified logical section of the associated source code. The computer system then includes creating a mockup image presenting the one or more graphical user interface components and the string. The computer system then includes labeling, in the created mockup image, each of the one or more graphical user interface components and the first string of the plurality of strings. The computer system then identifies one or more additional graphical user interface components in one or more additional logical sections adjacent or near to the first logical section, wherein the one or more additional graphical user interface components include both graphical user interface components and an additional one or more strings to be translated. The computer system then includes creating a mockup image presenting the one or more graphical user interface components and the string, and the one or more additional graphical user interface components.

DETAILED DESCRIPTION

Figure 1:
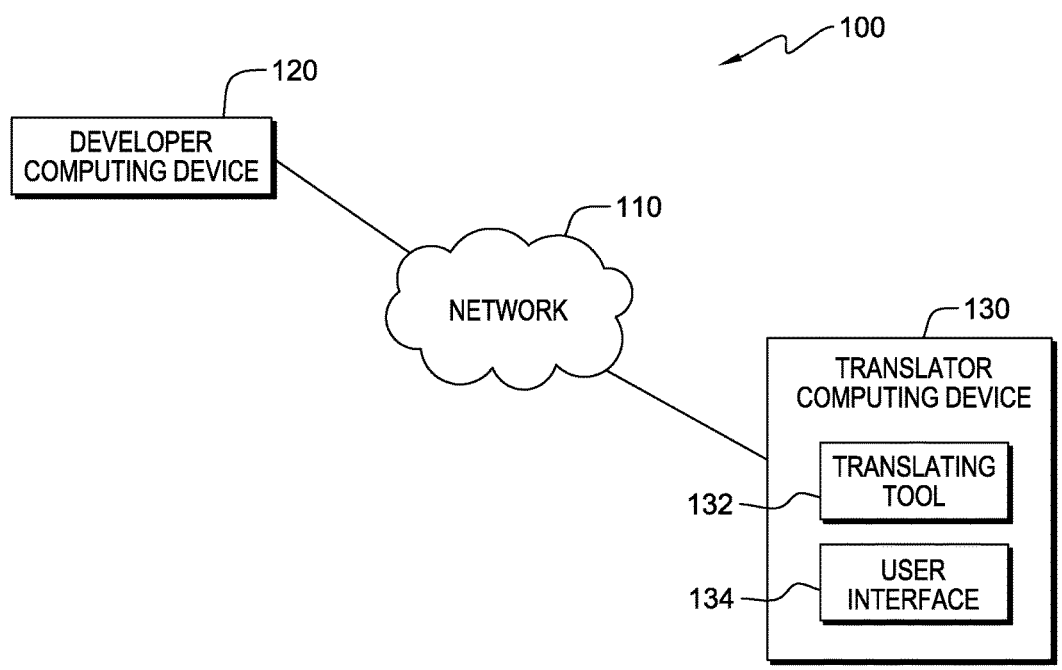
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention.

Distributed data processing environment 100 includes developer computing device 120 and translator computing device 130, all interconnected over network 110. Network 110 can be, for example, a local area network (LAN), a wide area network (WAN) such as the Internet, or any combination of the preceding, and can include wired, wireless, or fiber optic connections. In general, network 110 can be any combination of connections and protocols that will support communications between developer computing device 120 and translator computing device 130.

Developer computing device 120 can be a laptop computer, a tablet computer, a netbook computer, a personal digital assistant (PDA), a personal computer (PC), a smart phone, or any programmable electronic device capable of development of a software product, including computer programming, research, prototyping, modification, and maintenance, and capable of communicating with translator computing device 130. Developer computing device 120 sends application source code, markup language and a list of strings to translate to translator computing device 130.

Translator computing device 130 includes translating tool 132 and user interface (UI) 134. Translator computing device 130 can be a laptop computer, a tablet computer, a netbook computer, a PDA, a PC, a smart phone, or any programmable electronic device capable of communicating with developer computing device 120. Translator computing device 130 may include internal and external components, as depicted and described in further detail with respect to FIG. 4.

Translating tool 132 receives a resource file containing a list of strings to translate for a graphical user interface, and receives application source code and markup language referencing the strings to translate from developer computing device 120. Translating tool 132 creates mockup images representing the application graphical user interface, based on associated widgets, text labels, and layout found in the same, or nearby, logical section of application source code and markup language that references the strings to translate. The generated mockup images, with associated widgets, text labels, and layout labeled, are presented on UI 134 and can aid a translator in translating the strings, for example, a translator operating translator computing device 130 within distributed data processing environment 100. Translating tool 132 may be incorporated into development tools and continually generate images during the development phase, or alternatively, translating tool 132 may be incorporated after development, but prior to translation. UI 134 may be, for example, a graphical user interface (GUI) or a web user interface (WUI) and can display text, images, messages, documents, web browser windows, user options, application interfaces, source code, markup language, and instructions for operations.

Figure 2:
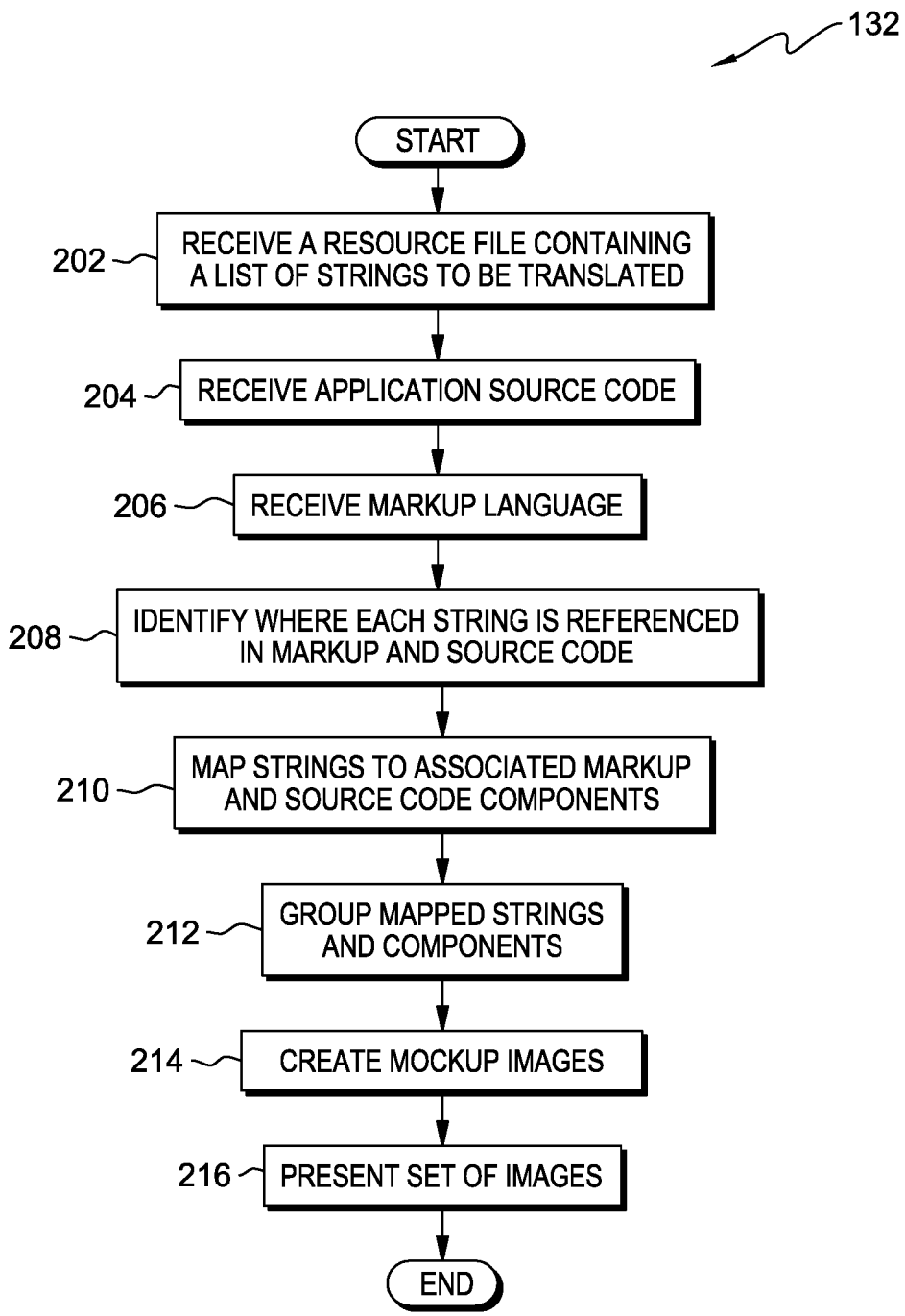
FIG. 2 is a flowchart depicting operational steps of a translating tool for receiving a list of strings translate, application source code and markup language referencing the list of strings to translate, and creating images based on the received information to provide context for translation, in accordance with an embodiment of the present invention.

FIG. 2 is a flowchart depicting operational steps of translating tool 132 for receiving a list of strings to translate, application source code and markup language referencing the list of strings to translate, and creating images based on the received information to provide context for translation, in accordance with an embodiment of the present invention.

Translating tool 132 receives a resource file containing a list of strings to be translated (step 202). A string is typically a sequence of characters which can be understood and implemented as a data type storing a sequence of elements and is used in most programming languages. Strings to be translated are stored in resource files, and within each resource file each string is identified by a unique key. For example, a string containing a user name text label or data box on a login screen may be identified with a key such as "ID_USER_NAME."

Translating tool 132 receives an application source code (step 204). The application source code references the strings to be translated.

Translating tool 132 receives markup language for the application (step 206). The markup language references the strings to be translated.

Translating tool 132 identifies, for each string, where in the markup language and application source code each string is referenced (step 208). Each string to be translated is referenced in the application source code and markup language and using the corresponding unique key of the string, translating tool 132 identifies the location of the string. In an exemplary embodiment of the present invention, a developer creates unique keys for each string when the resource files containing the strings to be translated are created. The unique keys and corresponding strings can then be located within the application source code and markup language. For example, in the application source code, a string to be translated can be identified using the "ID_USER_NAME" key and the correct string can be located by retrieving the key.

Translating tool 132 maps strings to associated markup language and source code components (step 210). Translating tool 132 creates a mapping of each string to be translated and associated components identified in the same logical section of markup language or the same logical section of application source code as the string. In various exemplary embodiments of the present invention, a logical section of application source code, or markup language, can be identified by a fixed or predefined number of lines of text, by opening and/or closing tags, "section" tags, or by any other means to denote a distinct part or division of markup language or code. Translating tool 132 can identify graphical user interface components, including widgets, dialogs, images, layout, or pages, used in the same markup or logical section of the source code. In an exemplary embodiment of the present invention, translating tool 132 can also identify additional strings to be translated being referenced within the same logical section of markup language or logical section of the source code.

Translating tool 132 groups mapped strings and components (step 212). The strings to be translated, and mappings to identified associated interface components and additional strings to be translated, are grouped to provide a context for each string to be translated. In various embodiments of the present invention, translating tool 132 may form groups based on the identification of mapped strings and components referenced within the same logical section of markup language. In other various embodiments of the present invention, groups may be formed based on the identification of strings to be translated and components in the same logical section of the application source code.

Translating tool 132 creates mockup images based on the groups of mapped strings (step 214). Translating tool 132 can generate a mockup image representing the application graphical user interface being translated and can show, based on the groups of mapped strings and components, interface items such as widgets, text labels, and layouts included with the application graphical user interface and located in the same logical section of source code or in the same logical section of markup language as each string to be translated. The created mockup images can show the various components labeled in order to show the corresponding context for each component.

Translating tool 132 presents a set of images (step 216). The created mockup images are presented on a UI, for example, UI 134 on translator computing device 130 in distributed data processing environment 100, to aid a translator by providing context for the translation of each string. In various embodiments of the present invention, the created images may represent such things as web pages, thick client pages, mobile application pages, dialogs, or other software applications.

Figure 3:
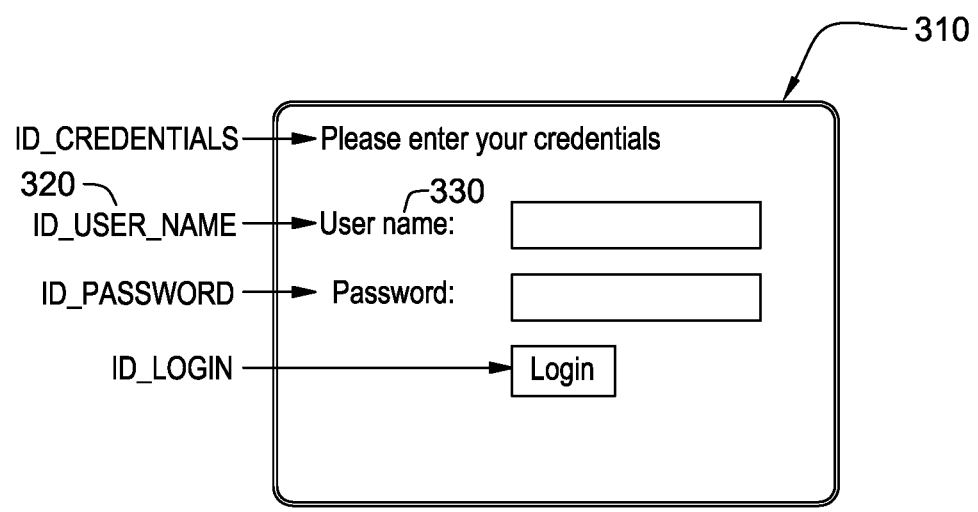
FIG. 3 is an exemplary diagram illustrating an image created by the translating tool and presented on a user interface to aid in translation, in accordance with an embodiment of the present invention.

FIG. 3 is an exemplary diagram illustrating an image created by translating tool 132 and presented on a user interface to aid in translation, in accordance with an embodiment of the present invention.

Form 310 may represent a login screen and includes a variety of widgets and text labels to be translated. Translating tool 132 identifies, in the application source code and the markup associated with the strings to be translated, locations of a unique key for each of the strings to be translated and identifies widgets and other components within the same section of source code or the same markup. For example, annotation 320 represents a unique key "ID_USER_NAME" which identifies a string for text label 330. Translating tool 132 creates a mockup image of the graphical user interface for form 310, which shows each string to be translated and associated interface components labeled with the unique key and annotations. The created mockup image provides context for translation of the text by presenting labeled components located in the same or nearby section of application source code or markup.

Figure 4:
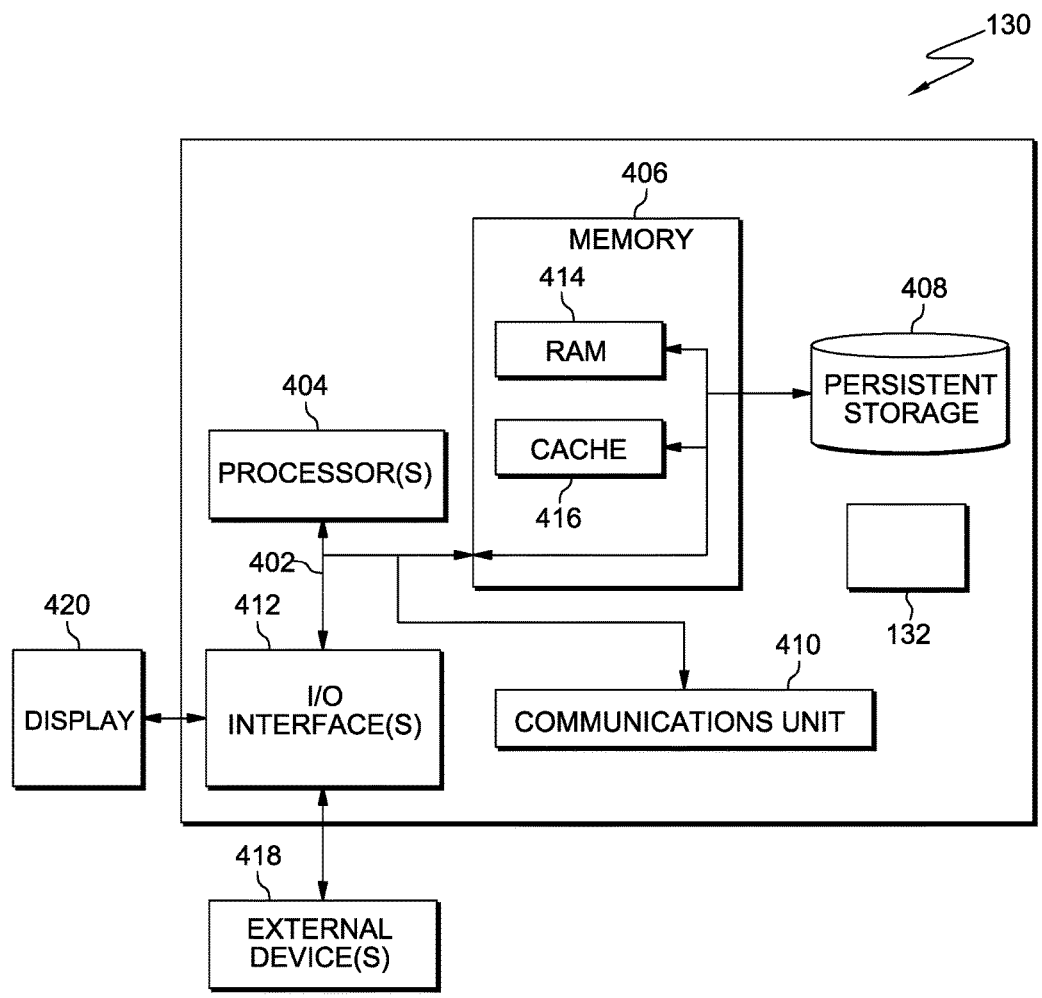
FIG. 4 depicts a block diagram of components of a data processing system, such as the translator computing device of FIG. 1, in accordance with an illustrative embodiment of the present invention.

FIG. 4 depicts a block diagram of components of a data processing system, such as translator computing device 130 of FIG. 1, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Translator computing device 130 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Translating tool 132 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including developer computing device 120. In these examples, communications unit 410 includes one or more network interface cards. Communications unit 410 may provide communications through the use of either or both physical and wireless communications links. Translating tool 132 may be downloaded to persistent storage 408 through communications unit 410.

I/O interface(s) 412 allows for input and output of data with other devices that may be connected to translator computing device 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., translating tool 132, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for generating a context for translating strings for a graphical user interface, the computer system comprising:
   one or more computer processors;
   one or more computer readable storage devices; and
   program instructions stored on at least one of the one or more computer readable storage devices for execution by at least one of the one or more computer processors, the stored program instructions executable by the at least one of the one or more computer processors to perform a method comprising:
   receiving a string to be translated and associated source code, the string identified by a unique key within the associated source code, the unique key used to identify a location of the string, and wherein the associated source code is markup language;
   identifying a first logical section of the associated source code corresponding to the unique key of the string;
   identifying one or more graphical user interface components within the identified logical section of the associated source code, wherein the one or more graphical user interface components includes one or more of: widgets, pages, dialogs, images, and graphics;
   creating a mapping of each string to be translated to the one or more graphical user interface components within the identified logical section of the associated source code;
   grouping the string to be translated, and the mapping to the one or more graphical user interface components to provide a context for each string to be translated;
   creating based, at least in part, on the grouping of the string to be translated and the mapping, a first mockup image presenting the one or more graphical user interface components and the string;
   labeling in the created first mockup image, each of the one or more graphical user interface components and the first string of the plurality of strings;
   identifying one or more additional graphical user interface components in one or more additional logical sections adjacent or near to the first logical section, wherein the one or more additional graphical user interface components include both graphical user interface components and an additional one or more strings to be translated; and
   creating a second mockup image presenting the one or more graphical user interface components and the string, and the one or more additional graphical user interface components.

\* \* \* \* \*